(12) United States Patent
Anttila

(10) Patent No.: US 7,321,574 B2
(45) Date of Patent: Jan. 22, 2008

(54) DATA PACKET TRANSFER RESTRICTIONS IN PACKET-SWITCHED DATA TRANSMISSION

(75) Inventor: Hannu Anttila, Tampere (FI)

(73) Assignee: Nokia Corporation, Espoo (FI)

( * ) Notice: Subject to any disclaimer, the term of this patent is extended or adjusted under 35 U.S.C. 154(b) by 870 days.

(21) Appl. No.: 10/743,207

(22) Filed: Dec. 22, 2003

(65) Prior Publication Data

US 2005/0135293 A1 Jun. 23, 2005

(51) Int. Cl.
*H04Q 7/00* (2006.01)
*H04J 3/16* (2006.01)

(52) U.S. Cl. .................. 370/328; 370/469; 714/748

(58) Field of Classification Search ......... 370/310–350
See application file for complete search history.

(56) References Cited

U.S. PATENT DOCUMENTS

| | | | |
|---|---|---|---|
| 6,771,659 B1* | 8/2004 | Parantainen et al. ........ | 370/466 |
| 2001/0012279 A1* | 8/2001 | Haumont et al. ........... | 370/331 |
| 2001/0043579 A1* | 11/2001 | Tourunen et al. .......... | 370/331 |
| 2001/0052091 A1* | 12/2001 | Goldsack et al. .......... | 714/704 |
| 2002/0082033 A1* | 6/2002 | Lohtia et al. ............... | 455/517 |
| 2003/0165133 A1* | 9/2003 | Garani ....................... | 370/347 |
| 2004/0097267 A1* | 5/2004 | Pecen et al. ................ | 455/560 |
| 2004/0252664 A1* | 12/2004 | Cao et al. ................... | 370/335 |
| 2006/0168313 A1* | 7/2006 | Robinson .................... | 709/236 |

OTHER PUBLICATIONS

Wessam Ajib and Philippe Godlewski, E.N.S.T., Dept. Inf-Res,Mobile Multimedia Communications, 1999 (MoMuC '99) 1999 IEEE International Workshop on, p. 311-317.*

* cited by examiner

*Primary Examiner*—Frantz Coby
*Assistant Examiner*—Juvena W Loo
(74) *Attorney, Agent, or Firm*—Hollingsworth & Funk, LLC

(57) ABSTRACT

A method of data packet handling in data transmission between a mobile station and a wireless telecommunication network, comprising protocol layers of a LLC layer for handling control information of data packet transmission and a RLC layer for transmitting the data packets between the mobile station and the network. A plurality of the RLC data units, received from the network, are transferred to the LLC as LLC PDUs and if a high load situation caused by the transfer of the LLC PDUs to the LLC layer is detected, the operation of the RLC layer is intermitted until a number of LLC PDUs has been acknowledged by the LLC layer. When the transfer of the LLC PDUs to the LLC layer is intermitted, also the acknowledgements of RLC PDUs on RLC layer between the mobile station and the wireless telecommunication network are intermitted.

21 Claims, 4 Drawing Sheets

DATA PACKET TRANSFER RESTRICTIONS IN PACKET-SWITCHED DATA TRANSMISSION

FIELD OF THE INVENTION

The invention relates to packet-switched data transmission and more precisely to restricting data packet transfer in overload situations.

BACKGROUND OF THE INVENTION

A second-generation mobile communication system GSM (Global System for Mobile Communications) includes a packet-switched data transmission enhancement called GPRS (General Packet Radio Service). In the GPRS system, the user data transmission between the mobile station MS and the base station system of the GSM network over the radio interface Um is performed in accordance with the conventional GSM protocol, the data being transferred over the radio interface Um as radio link layer packet data units (RLC PDU). The protocol stacks of the mobile station MS, on one hand, and of the serving GPRS support node SGSN located in the network, on the other hand, include the higher protocol layers defining further the data packet transfer. These protocol layers include two layers, SNDCP (Sub-Network Dependent Convergence Protocol) and LLC (Logical Link Control).

User data transmitted in the SNDCP layer is segmented to one or more SNDC data units, whereby the user data and the header field associated with it can optionally be compressed. The SNDC data units are transmitted in LLC frames, which are associated with address and checking information essential to the data transmission, and in which frames the SNDC data units can be encrypted. The function of the LLC layer is to maintain the data transmission connection between the mobile station MS and the serving node SGSN and to retransmit the damaged frames. For the transmission over the radio interface Um these LLC frames are divided into radio link layer packet data units RLC PDU. On the reception, steps to the opposite direction are performed, i.e. RLC PDUs are shifted to the LLC layer and further to the SNDCP layer, while simultaneously checking the structure and the integrity of the data according to each layer.

A problem may occur, when transferring the RLC PDUs to the LLC layer. In the GPRS packet transfer, the received/sent LLC PDU sizes (without LLC headers) according to the GPRS standards can vary from 1 to 1520 bytes. RLC layer delivers every packet separately to LLC layer. For example, if the transferred file size is 1000 bytes, this can generate only one packet (LLC PDU) or, in the worst case, even 1000 packets (1 byte in each LLC PDU). Especially from the mobile station's MS viewpoint, this sets high requirements for MCU (Master Control Unit) processor to handle a largely varying load.

When the RLC layer of the mobile station receives many small RLC packets from the network, the RLC layer delivers packets to LLC layer as LLC packets comprising typically several RLC packets as concatenated into one LLC packet. Normally the LLC layer and the SNDCP layer would receive the packets and transfer them upwards. If the RLC layer has higher priority than the other layers, the RLC layer uses most of the processing power, resulting in that the LLC layer and the SNDCP layer can subsequently handle only a small subset of packets. The RLC layer is working in full speed, inserting more and more packets in the stack between the RLC and the LLC. Finally the mobile station runs out of memory and crashes. Moreover, there exists no procedure to tell the network to slow down transmission speed in the RLC layer.

SUMMARY OF THE INVENTION

Now it has been invented an improved method and an apparatus implementing the method for handling data packet transfer between protocol layers. As different aspects of the invention a method, a wireless telecommunication system, a mobile station and a computer software product are introduced, which are characterized in what is disclosed in the independent claims.

Some embodiments of the invention are disclosed in the dependent claims.

The first aspect of the invention includes a method of data packet handling in packet-switched data transmission between a mobile station and a wireless telecommunication network, wherein a telecommunication protocol of said wireless telecommunication network comprises a link control layer for handling control information relating to the data packet transmission and a radio link layer for transmitting the data packets as data units and for acknowledging the transmission between the mobile station and the wireless telecommunication network. The method comprises: receiving a plurality of radio link layer data units on the radio link layer; transferring a number of the radio link layer data units to the link control layer as link control layer data units; detecting a high load situation caused by the transfer of the link control layer data units to the link control layer; and intermitting the operation of the radio link layer until a number of link control layer data units has been acknowledged by the link control layer.

According to an embodiment, the method further comprises: setting a first threshold value for limiting the number of link control layer data units transferred to the link control layer without acknowledgement from the link control layer; setting a second threshold value for the number of the link control layer data units to be acknowledged by the link control layer; and if the number of unacknowledged link control layer data units equals to the number defined by the first threshold value, intermitting the transfer of the link control layer data units, until a number of link control layer data units, defined by the second threshold value, has been acknowledged by the link control layer.

According to an embodiment, said acknowledgement from the link control layer is performed in response to transferring said link control layer data units to an upper protocol layer.

According to an embodiment the upper protocol layer is a convergence protocol layer.

According to an embodiment, in response to intermitting the transfer of the link control layer data units to the link control layer, the acknowledgements of radio link layer data units on radio link layer between the mobile station and the wireless telecommunication network are intermitted.

According to another embodiment, the method further comprises: including an acknowledgement request in at least one link control layer data unit to be transferred to the link control layer, the transferring of which link control layer data unit starts a timer; and in response to said timer expiring before an acknowledgement is received from the link control layer, intermitting the transfer of the link control layer data units, until acknowledgement of a predefined number of link control layer data units is received from the link control layer.

According to a further embodiment, if said timer is used to intermit the transfer of the link control layer data units to the link control layer, the method further comprises intermitting the acknowledgements of radio link layer data units on radio link layer between the mobile station and the wireless telecommunication network.

The different aspects of the invention provide the advantage that a situation, wherein the interface between the radio link layer and the link control layer would consume all the processing capacity and the memory needed for data stack, is prevented. Thus, high load situations caused by a plurality of small packets will not exist any more. Another advantage is that MCU processors with less processing capacity can be used, because no extra power needs to be reserved for smaller packets. Furthermore, the amount of dynamic memory needed for data stack can be more accurately estimated. A further advantage is that the flow control of the RLC PDUs between the radio link layers of the mobile station and the network is enabled such that the radio link layer data stack of mobile station is not overloaded. Furthermore, no radio link layer data packets are lost, since they are stored in the buffer memory of the network.

BRIEF DESCRIPTION OF THE DRAWINGS

In the following the invention will be described in greater detail in connection with some embodiments, with reference to the attached drawings, in which.

DETAILED DESCRIPTION OF THE EMBODIMENTS

The invention will now be described by way of an example in connection with packet radio services according to the GPRS system. However, the invention is not restricted only to the GPRS, but it can be applied to any packet-switched data transmission method requiring restriction of inter-layer data packet transfer.

Figure 1:
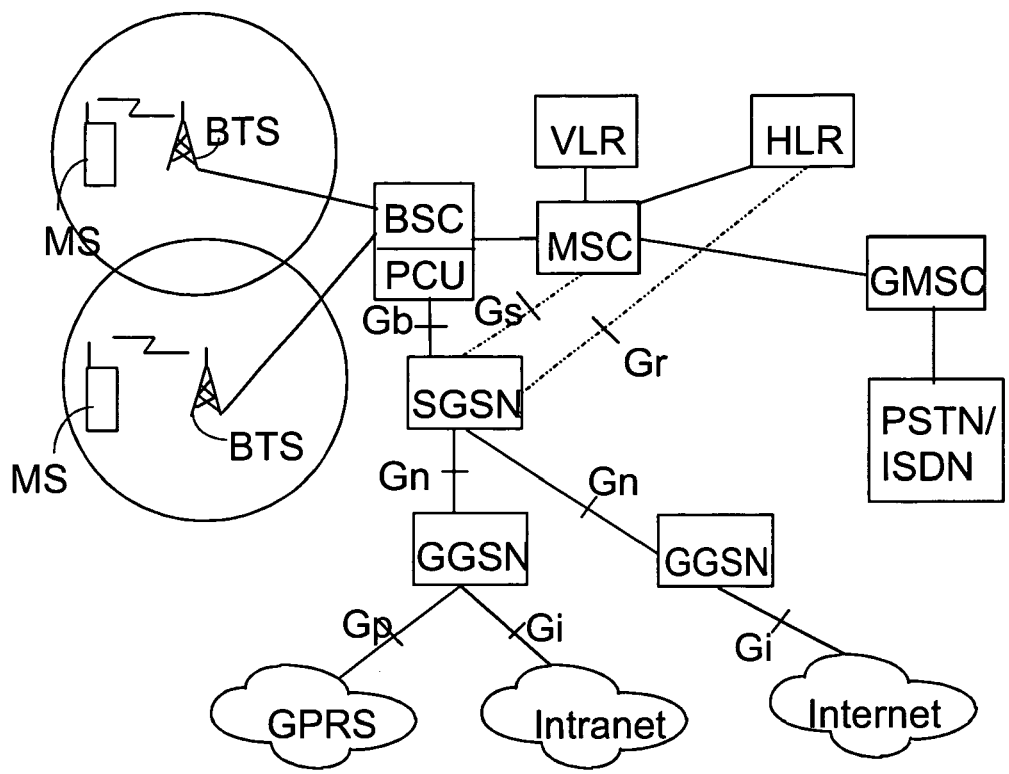
FIG. 1 shows a block diagram of the structure of the GSM/GPRS system.

FIG. 1 illustrates how the GPRS system is built on the basis of the GSM system. The GSM system comprises mobile stations (MS), which communicate with base transceiver stations (BTS) over the radio path. A base station controller (BSC) is connected with several base transceiver stations, which use radio frequencies and channels controlled by the base station controller. The base station controllers communicate via an interface A with a mobile services switching centre (MSC), which is responsible for connection establishments and for routing calls to right addresses. Two databases comprising information on mobile subscribers are used as help: a home location register (HLR) with information on all subscribers of the mobile communication network and the services they have subscribed to, and a visitor location register (VLR) with information on the mobile stations visiting the area of a certain mobile services switching centre. The mobile services switching centre is in connection with other mobile services switching centres via a gateway mobile services switching centre (GMSC) and with a fixed telephone network PSTN (Public Switched Telephone Network). A more detailed description of the GSM system can be found in the ETSI/GSM specifications and the book "*The GSM system for Mobile Communications*", M. Mouly and M. Pautet, Palaiseau, France, 1992, ISBN:2-957190-07-7.

The GPRS system connected to the GSM network comprises two, almost independent functions: a gateway GPRS support node (GGSN) and a serving GPRS support node (SGSN). The GPRS network may comprise several gateway nodes and serving nodes, and typically several serving nodes (SGSN) are connected to one gateway node (GGSN). Both nodes (SGSN and GGSN) function as routers, which support the mobility of the mobile station, control the mobile communication system and route data packets to mobile stations regardless of their location and the protocol used. The serving node (SGSN) communicates with the mobile station via the mobile communication network. The connection to the mobile communication network (interface Gb) is typically established either via the base transceiver station or the base station controller. The function of the serving node (SGSN) is to detect the mobile stations in its service area which are capable of GPRS connections, send data packets to and receive data packets from these mobile stations and monitor the location of the mobile stations in its service area. In addition, the serving node (SGSN) communicates with the mobile services switching centre and the visitor location register via a signalling interface Gs and with the home location register via an interface Gr. There are also GPRS records, which contain the contents of subscriber-specific packet data protocols stored in the home location register.

The gateway node (GGSN) functions as a gateway between the GPRS network and an external data network PDN (Packet Data Network). The external data network may be e.g. the GPRS network of another network operator, the Internet, an X.25 network or a private local area network. The gateway node (GGSN) communicates with these data networks via an interface Gi. The data packets to be transferred between the gateway node (GGSN) and the serving node (SGSN) are always encapsulated according to the GPRS standard. The gateway node (SGSN) also contains the PDP addresses (Packet Data Protocol) and routing data, i.e. the (SGSN) addresses, of the GPRS mobile stations. The routing data are used for linking data packets between the external network and the serving node (SGSN). The GPRS core network between the gateway node (GGSN) and the serving node (SGSN) is a network utilizing an IP protocol, preferably IPv6 (Internet Protocol, version 6).

Figure 2:
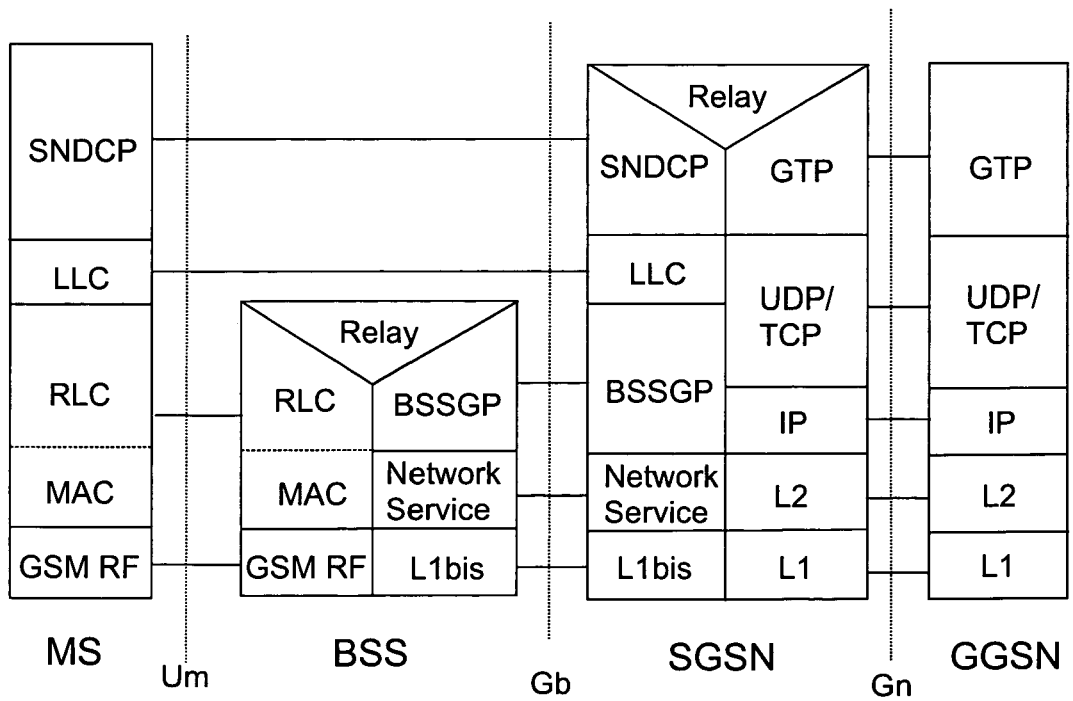
FIG. 2 shows the protocol stack of GPRS user data connections.

FIG. 2 shows the protocol stack of the GPRS, which is used for user data transmission in the system. FIG. 2 illustrates a protocol stack between the mobile station and the gateway node in the GPRS system, the protocol stack being used for user data transmission. The data transmission between the mobile station and the base station system of the GSM network over the radio interface Um is performed in accordance with the conventional GSM protocol. On the interface Gb between the base station system (BSS) and the serving node, the lowest protocol layer has been left open, and either the ATM protocol or the Frame Relay protocol is used in the second layer. The BSSGP layer (Base Station System GPRS Protocol) above it provides the data packets to be transmitted with specifications relating to routing and quality of service and with signallings relating to data packet acknowledgement and Gb interface management.

Direct communication between the mobile station and the serving node is defined in two protocol layers, SNDCP (Sub-Network Dependent Convergence Protocol) and LLC (Logical Link Control). User data transmitted in the SNDCP layer are segmented to one or more SNDC data units, whereby the user data and the TCP/IP header field or the UDP/IP header field associated with it can optionally be compressed. The SNDC data units are transmitted in LLC frames, which are associated with address and checking information essential to the data transmission, and in which frames the SNDC data units can be encrypted. The function of the LLC layer is to maintain the data transmission connection between the mobile station and the serving node and to retransmit the damaged frames. The serving node is responsible for routing data packets coming from the mobile station further to the right gateway node. A tunnelling protocol (GTP, GPRS Tunnelling Protocol) is used in this connection, encapsulating and tunnelling all user data and signalling that are transmitted through the GPRS core network. The GTP protocol is run above, the IP used by the GPRS core network.

The RLC and MAC (Media Access Control) layers above the physical layer are responsible for the actual transmission of the data packets over the radio interface Um as radio link layer packet data units (RLC PDU) and for the acknowledgement of successful transmission. The received RLC PDUs are concatenated into LLC PDUs and transferred to the LLC layer. From the LLC layer, the LLC frames are further delivered to the SNDCP layer, where the SNDC data units are recreated and shifted further to the application layer.

The above-mentioned problems concerning the implications in the data packet transfer between protocol layers can be avoided by a procedure, wherein the high load caused by the RLC layer, when transferring the LLC PDUs to the LLC layer, is detected and the overload of the processor is prevented by restricting, in a proper manner, the transfer of the LLC PDUs to the LLC layer.

According to an embodiment, the high load caused by the RLC layer is detected such that the RLC layer is only allowed to transfer a limited number of unacknowledged LLC PDUs to the LLC layer. The number can be denoted, for example, by n. The RLC layer expects to receive acknowledgements from each of the transferred LLC PDUs from the LLC layer. If the RLC layer has transferred n packets, i.e. LLC PDUs, without any acknowledgement from the LLC layer, the RLC layer stops transferring the packets to the LLC layer. This releases processing power to such extent that LLC can start handling the received LLC PDUs and delivering them upwards to the SNDCP layer. Only after the LLC layer has transferred a certain number, for example number of a (typically a<=n), data packets to the upper layer and acknowledged said data packets to the RLC layer, the RLC layer may again start transferring LLC PDUs to the LLC layer.

The procedure prevents a situation wherein the RLC-LLC interface would consume all the processing capacity and the dynamic RAM (Random Access Memory) needed for data stack. Thus, high load situations caused by a plurality of small packets will not exist any more. This enables to use MCU processors with less processing capacity, since there doesn't have to be extra power just in case of smaller packets. These kinds of MCU processors are typically less expensive. Furthermore, the amount of dynamic RAM needed for data stack can be more accurately estimated.

According to another embodiment, the high load caused by the RLC layer is detected by a timer triggered by a LLC PDU transferred to the LLC layer. The RLC layer includes an acknowledgement request to a certain LLC PDU, whereby a timer is started, when the LLC PDU including the request is transferred to the LLC layer. If the timer expires before any acknowledgement is received from the LLC layer, the RLC layer stops transferring the packets to the LLC layer. The LLC PDU, wherein the acknowledgement request is included, can be determined such that if number (b) of LLC PDUs, for example b=5, has been shifted to the LLC layer without any received acknowledgement, the acknowledgement request should be included in the next LLC PDU. The timer is preferably set such that the number of unacknowledged LLC PDUs on the LLC layer cannot grow so high that it would cause the overload of the processor. When the RLC layer stops transferring the packets to the LLC layer in response to the expiration of the timer, processing power is released for the LLC layer to start handling the received LLC PDUs and delivering them upwards SNDCP layer.

Since the RLC layer of the mobile station has temporarily stopped transferring the packets to the LLC layer, it would be advantageous to inform the network to stop transmitting RLC PDUs to the mobile station. The temporary stoppage of the RLC layer is, however, not a prior known function, and therefore there has not been any flow control method to control the operation of the network RLC layer. According to yet another embodiment, the flow control between the RLC layers of the mobile station and the network can be carried out such that the RLC layer of the mobile station stops acknowledging the RLC PDUs sent by the network, but the RLC layer of the mobile station simply discards them.

The RLC layer of the network stores all unacknowledged RLC PDUs in a buffer memory, wherefrom they are not deleted until they are acknowledged by the mobile station. The RLC layer of the network keeps on sending RLC PDUs to the mobile station. Eventually, the RLC layer of the network requests an acknowledgement from the mobile station, whereby the RLC layer of the mobile station responds by sending an acknowledgement, the content of which is zero ('0'). This means that the unacknowledged RLC PDUs sent by the network are missing. The network interprets this as poor radio condition and starts to retransmit the buffered unacknowledged RLC PDUs to the mobile station. The retransmission will take place as many times as is required to receive acknowledgements from the mobile station.

Thus, a procedure is provided which enables to control the flow of the RLC PDUs between the RLC layers of the mobile station and the network such that the RLC data stack of mobile station is not overloaded. Furthermore, no RLC PDUs are lost, since they are stored in the buffer memory of the network.

Figure 3:
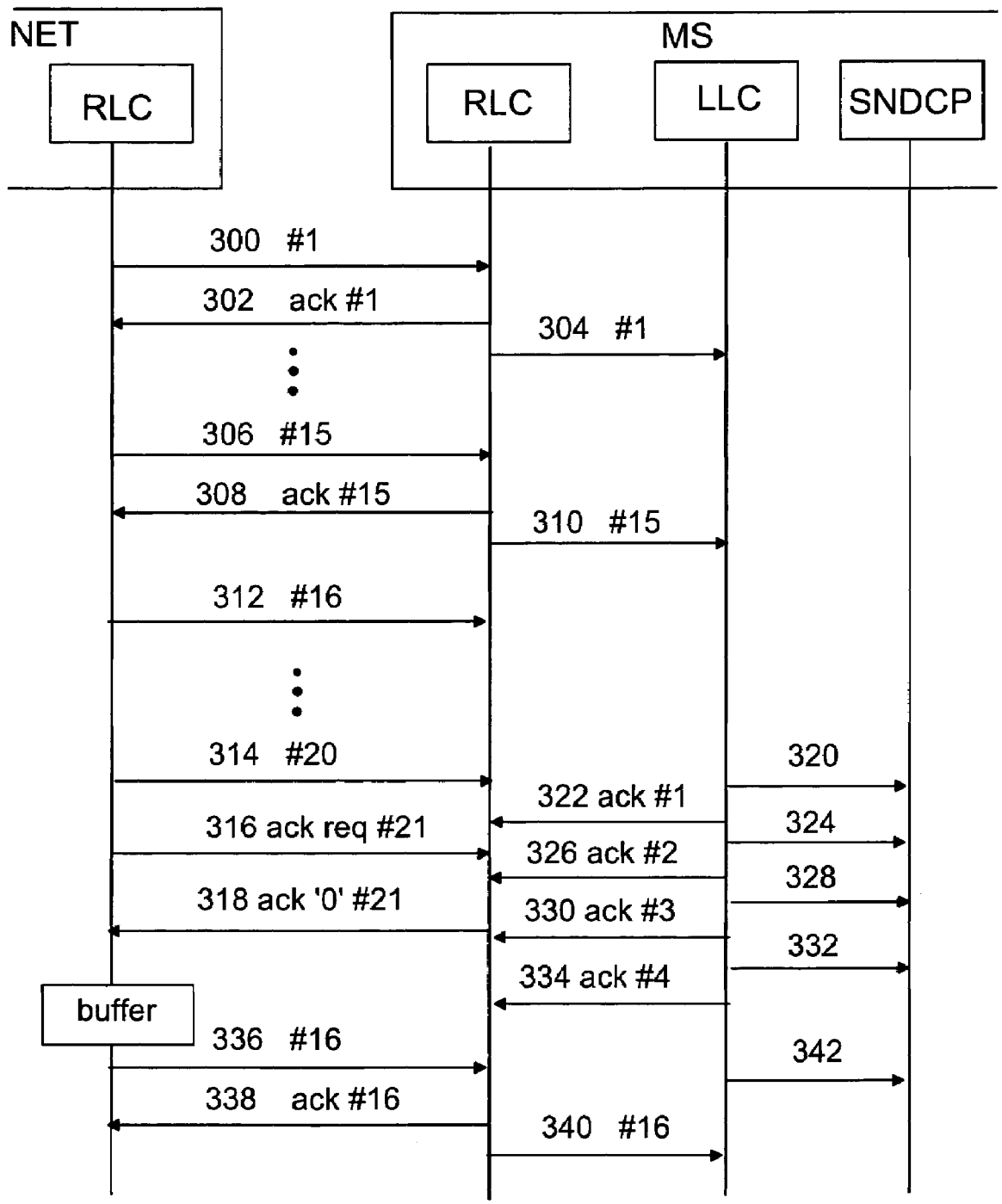
FIG. 3 shows a signalling diagram according to an embodiment of the invention.

Some of the embodiments relating to the high load detection of the RLC layer and the flow control between the RLC layers of the mobile station MS and the network can be further illustrated by means of FIG. 3, wherein an example of the implementation is depicted. In this example, the RLC layer is only allowed to transfer a limited number of unacknowledged LLC PDUs to the LLC layer, wherein the number n=15. Moreover, the LLC layer must handle and acknowledge at least four (a=4) LLC PDUs to the RLC layer, before the RLC layer may continue to transfer LLC PDUs to the LLC layer. For the sake of simplification, it is assumed herewith that each RLC PDU is transferred to the LLC layer in a separate LLC PDU. In practice, an LLC PDU very seldom includes only one RLC PDU, but typically several RLC PDUs are concatenated as one LLC PDU.

In FIG. 3, the RLC layer of the network (NET) transmits (300) the first RLC PDU (#1) to the RLC layer of the mobile station (MS), and the mobile station acknowledges (302) it (ack #1). Then the RLC layer of the mobile station transfers (304) the first LLC PDU (#1) to the LLC layer, but receives no acknowledgement. The same procedure continues for the next 14 RLC PDUs, including the similar handling of the 15$^{th}$ RLC PDU (#15): the RLC layer of the network transmits (306) the 15$^{th}$ RLC PDU (#15) to the RLC layer of the mobile station, the mobile station acknowledges (308) it (ack #15) and transfers (310) the 15$^{th}$ LLC PDU (#15) further to the LLC layer, but again receives no acknowledgement.

The RLC of the mobile station has now reached the limit of 15 unacknowledged LLC PDUs transferred to the LLC layer, and thus the RLC stops transferring any new LLC PDUs to the LLC layer. The RLC layer of the network, however, continues to transmit (312, 314) new RLC PDUs (#16-#20) to the RLC layer of mobile station, but the mobile station discards the packets. Then the RLC layer of the network transmits (316) another RLC PDU including an acknowledgement request (ack req #21) to the RLC of the mobile station. The mobile station acknowledges (318) it with zeroes (ack '0' #21), indicating the latest six (#16-#21) RLC PDUs as missing. The network starts the retransmission of the missing RLC PDUs.

Meanwhile, considerable amount of processing power of the mobile station's MCU has been allocated to the LLC and SNDCP layers, because the RLC layer is temporarily precluded from handling the data packets. This means that the LLC layer may start handling the LLC PDUs transferred by the RLC layer. The LLC layer recovers the LLC frames, delivers (320, 324, 328, 332) them further to the SNDCP layer and acknowledges (322, 326, 330, 334) the first four (#1-#4) of the received LLC PDUs to the RLC layer. After receiving acknowledgements from at least four (a=4) LLC PDUs, the RLC layer may continue to transfer LLC PDUs to the LLC layer. This happens when the network again retransmits of the missing RLC PDUs (#16-#21).

The network retransmits (336) the 16$^{th}$ RLC PD-U (#16), the mobile station acknowledges (338) it (ack #16) and transfers (340) the 16$^{th}$ LLC PDU (#16) further to the LLC layer. Meanwhile, the LLC layer has continued to handle the previously transferred LLC PDUs by delivering at least some of them (342) to the SNDCP layer.

In the above example, the parameters n and a have been selected as having only exemplary values (n=15, a=4). It is, however, evident that a skilled man would easily find the optimal values of the parameters n and a such that in small packet situation, the MCU would work in the best available speed without interrupts.

Figure 4:
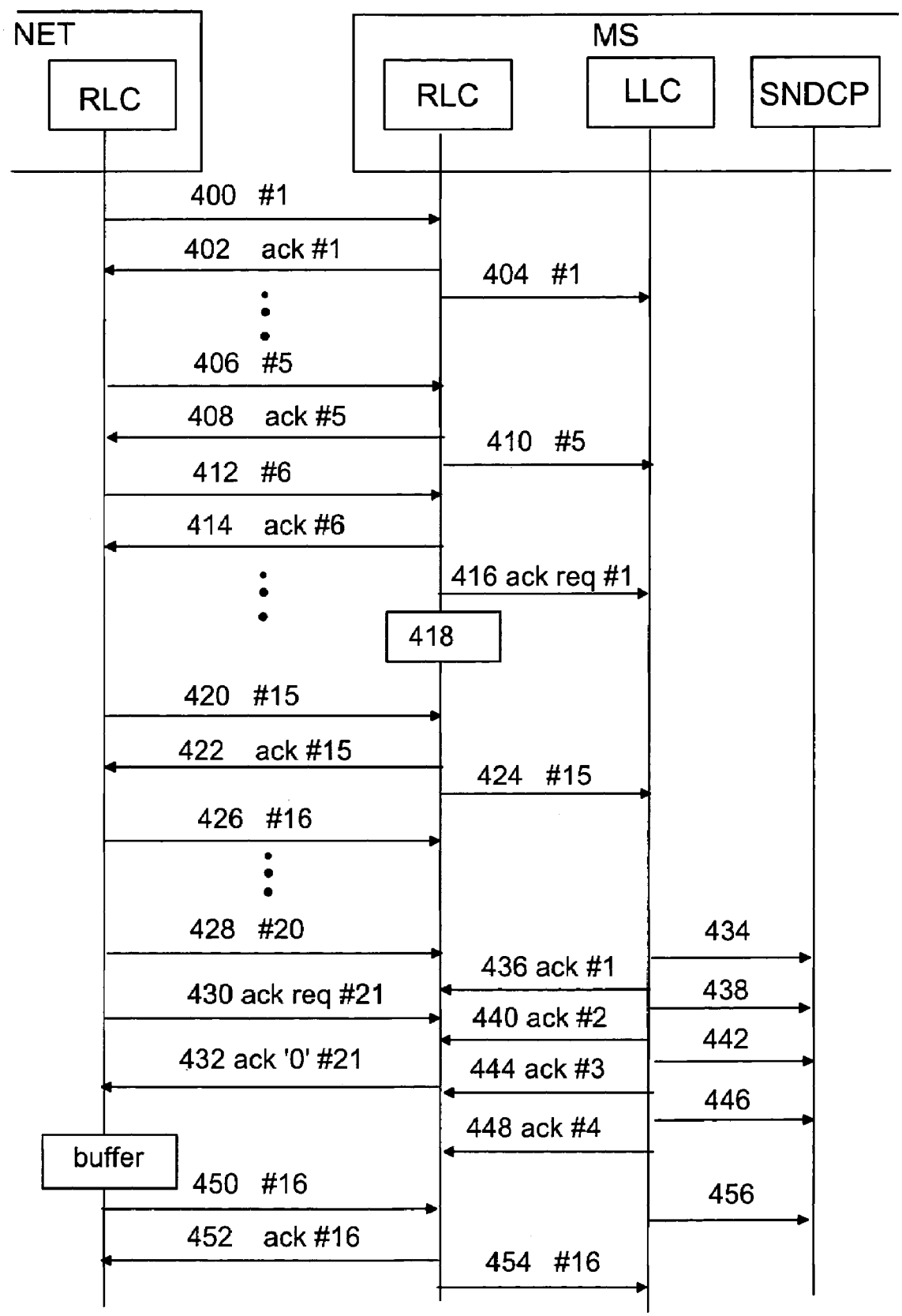
FIG. 4 shows a signalling diagram according to another embodiment of the invention.

FIG. 4 depicts another example of the implementation, wherein the operation of the RLC layer is controlled by a timer triggered by some (in this example five) unacknowledged LLC PDUs transferred to the LLC layer. In other respects, the example is similar to the previous one, i.e. the LLC layer must first handle and acknowledge at least four (a=4) LLC PDUs to the RLC layer, and provided the timer has expired, the RLC layer may not continue to transfer LLC PDUs to the LLC layer until acknowledgement is received from the LLC layer.

In FIG. 4, the RLC layer of the network (NET) transmits (400) the first RLC PDU (#1) to the RLC layer of the mobile station (MS), and the mobile station acknowledges (402) it (ack #1). Then the RLC layer of the mobile station transfers (404) the first LLC PDU (#1) to the LLC layer, but receives no acknowledgement. The same procedure continues for the next 4 RLC PDUs, including the similar handling of the 5$^{th}$ RLC PDU (#5): the RLC layer of the network transmits (406) the 5$^{th}$ RLC PDU (#5) to the RLC layer of the mobile station, the mobile station acknowledges (408) it (ack #5) and transfers (410) the 5$^{th}$ LLC PDU (#5) further to the LLC layer, but again receives no acknowledgement.

Now when the RLC layer of the network transmits (412) the 6$^{th}$ RLC PDU (#6) to the RLC layer of the mobile station, the mobile station acknowledges (414) it (ack #6), includes an acknowledgement request to it and transfers (416) the 6$^{th}$ LLC PDU (ack req #6) further to the LLC layer. The transfer of a LLC PDU with an acknowledgement request also triggers the timer (418) for the acknowledgement from the LLC layer. While the timer is running, the RLC layer of the mobile station continues to transfer LLC PDUs to the LLC layer. When the timer expires and controls the RLC to stop transferring any new LLC PDUs to the LLC layer, altogether 15 unacknowledged LLC PDUs (424) has been transferred to the LLC layer.

The rest of the procedure is similar to the previous example. The RLC layer of the network continues to transmit (426, 428) new RLC PDUs (#16-#20) to the RLC layer of the mobile station, but the mobile station discards the packets. The RLC layer of the network transmits (430) another RLC PDU including an acknowledgement request (ack req #21) to the RLC of the mobile station. The mobile station acknowledges (432) it with zeroes (ack '0' #21), indicating the latest six (#16-#21) RLC PDUs as missing. The network starts the retransmission of the missing RLC PDUs.

Meanwhile, the LLC layer starts handling the LLC PDUs transferred by the RLC layer. The LLC layer recovers the LLC frames, delivers (434, 438, 442, 446) them further to the SNDCP layer and acknowledges (436, 440, 444, 448) the first four (#1-#4) of the received LLC PDUs to the RLC layer. After receiving acknowledgements from at least four (a=4) LLC PDUs, the RLC layer may continue to transfer LLC PDUs to the LLC layer. The network retransmits (450) the 16$^{th}$ RLC PDU (#16), the mobile station acknowledges (452) it (ack #16) and transfers (454) the 16$^{th}$ LLC PDU (#16) further to the LLC layer.

Figure 5:
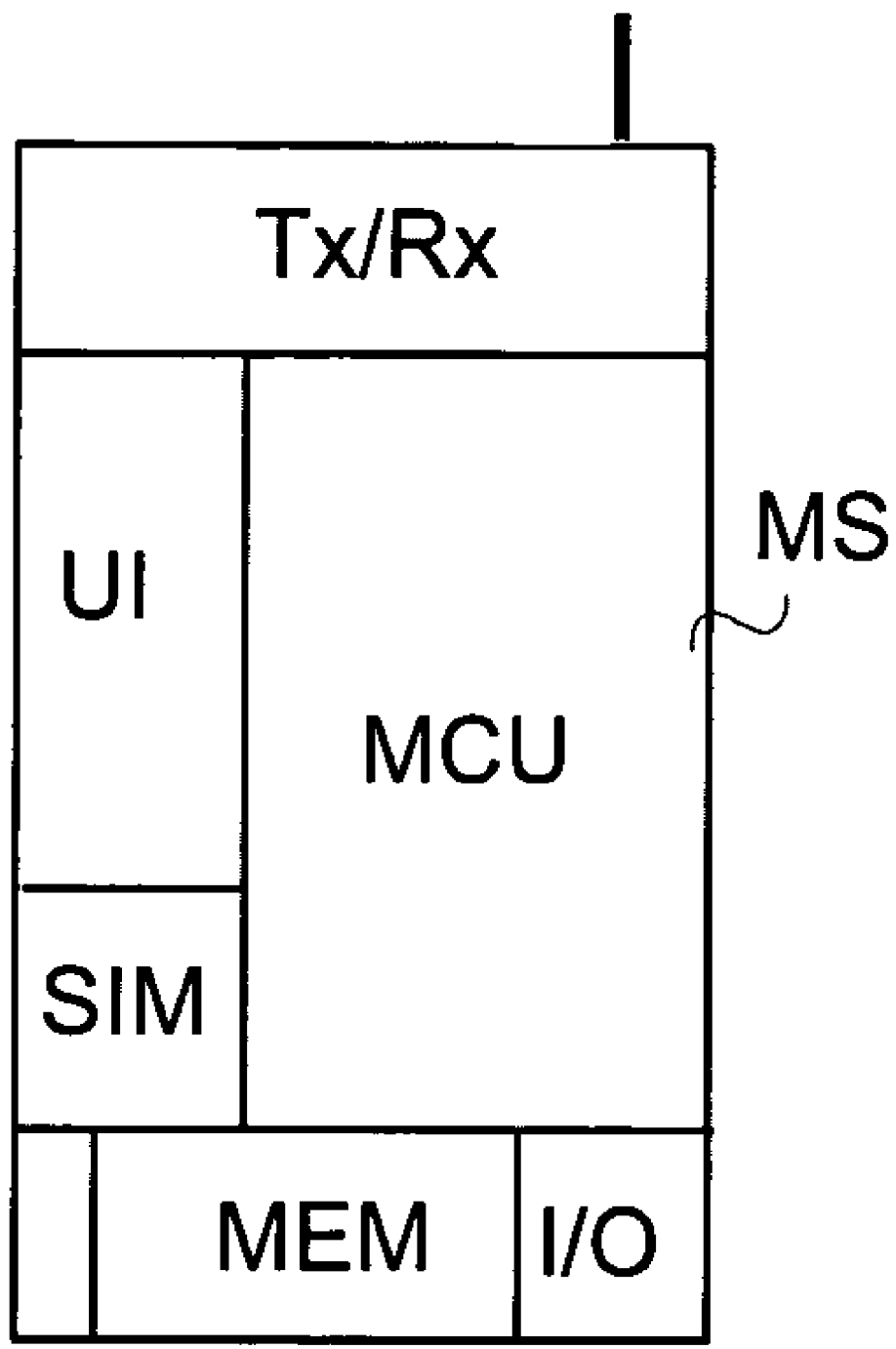
FIG. 5 shows a simplified block diagram of a mobile station, wherein the invention can be implemented.

FIG. 5 illustrates a simplified structure of a mobile station MS according to an embodiment of the invention. The mobile station includes a transceiver Tx/Rx, which communicates with the wireless network, typically with a base transceiver station (BTS) through an antenna. User Interface (UI) equipment typically includes a display, a keypad, a microphone and a loudspeaker. The mobile station further includes a Subscriber Identity Module (SIM) for storing e.g. user identity data and short messages. A computer program code executed by a Master Control Unit (MCU) comprising a processor may be stored in a memory (MEM) in the mobile station. The memory includes a non-volatile portion for storing the applications controlling the master control unit and other data to be stored and a volatile portion to be used for temporary data processing.

A mobile station according to an embodiment of the invention is arranged to receive a plurality of radio link layer data units on the radio link layer; transfer a number of the radio link layer data units to the link control layer as link control layer data units; detect a high load situation caused by the transfer of the link control layer data units to the link control layer; and intermit the operation of the radio link layer until a number of link control layer data units has been acknowledged by the link control layer.

For implementing an embodiment of invention, the mobile station may comprise means for defining a first threshold value for limiting the number of received radio link layer data units transferred to the link control layer without acknowledgement from the link control layer, means for defining a second threshold value for the number of the radio link layer data units to be acknowledged by the link control layer, a receiver for receiving a plurality of radio link layer data units on the radio link layer from the wireless telecommunication network, means for transferring a number of the radio link layer data units to the link control layer and means, responsive to the number of unacknowledged radio link layer data units being equal to the number defined by the first threshold value, for intermitting the transfer of the radio link layer data units, until a number of radio link layer data units, defined by the second threshold value, has been acknowledged by the link control layer.

For implementing another embodiment of the invention, the mobile station may comprise, instead of, or in addition to the means for defining the threshold values, a timer, whose the start of which is responsive to a transfer of a radio link layer data unit including an acknowledgement request to the link layer, means for transferring a number of the radio link layer data units to the link control layer, at least one radio link layer data unit including an acknowledgement request, and means for intermitting the transfer of the radio link layer data units, if said timer expires before an acknowledgement is received from the link control layer, until acknowledgement of a predefined number of radio link layer data units is received from the link control layer.

The data transfer between the protocol layers and the related control operations according to the above embodiments are typically implemented by executing computer software code stored in the memory (MEM) in the MCU. Thus, said means for carrying out the data transfer functions mentioned above are typically performed as computer software code. The computer software may be stored into any memory means, such as the hard disk of a PC or a CD-ROM disc, from where it can be loaded into the memory of mobile station. The computer software can also be loaded through a network, for instance using a TCP/IP protocol stack. It is also possible to use hardware solutions or a combination of hardware and software solutions for implementing the inventive means.

Thus, the computer software may preferably comprise software code for transferring a number of the radio link layer data units, received from the wireless telecommunication network, to the link control layer as link control layer data units; software code for detecting a high load situation caused by the transfer of the link control layer data units to the link control layer; and software code for intermitting the operation of the radio link layer until a number of link control layer data units has been acknowledged by the link control layer.

According to an embodiment, the computer software may further comprise software code for defining, a first threshold value for limiting the number of link control layer data units transferred to the link control layer without acknowledgement from the link control layer, software code for defining a second threshold value for the number of the link control layer data units to be acknowledged by the link control layer, and software code, responsive to the number of unacknowledged link control layer data units being equal to the number defined by the first threshold value, for intermitting the transfer of the link control layer data units, until a number of link control layer data, units, defined by the second threshold value, has been acknowledged by the link control layer.

According to another embodiment, the computer software may further comprise software code, responsive to intermitting the transfer of the link control layer data units to the link control layer, for intermitting the acknowledgements of radio link layer data units on radio link layer between the mobile station and the wireless telecommunication network.

It is obvious for a person skilled in the art that as technology develops, the basic idea of the invention can be implemented in various ways. Thus, the invention and the embodiments thereof are not restricted to the above examples but may be modified within the scope of the claims.

The invention claimed is:

1. A method of data packet handling in packet-switched data transmission between a mobile station and a wireless telecommunication network, wherein a telecommunication protocol of said wireless telecommunication network comprises a link control layer for handling control information relating to the data packet transmission and a radio link layer for transmitting the data packets as data units and for acknowledging the transmission between the mobile station and the wireless telecommunication network, the method comprising:

receiving a plurality of radio link layer data units on the radio link layer;

transferring a number of the radio link layer data units to the link control layer as link control layer data units;

detecting a high load situation caused by the transfer of the link control layer data units to the link control layer; and intermitting the operation of the radio link layer until a number of link control layer data units has been acknowledged by the link control layer.

2. A method as claimed in claim 1, further comprising setting a first threshold value for limiting the number of link control layer data units transferred to the link control layer without acknowledgement from the link control layer;

setting a second threshold value for the number of the link control layer data units to be acknowledged by the link control layer; and if the number of unacknowledged link control layer data units equals to the number defined by the first threshold value, intermitting the transfer of the link control layer data units, until a number of link control layer data units, defined by the second threshold value, has been acknowledged by the link control layer.

3. A method as claimed in claim 2, further comprising performing said acknowledgement from the link control layer in response to transferring said link control layer data units to an upper protocol layer.

4. A method as claimed in claim 3, wherein the upper protocol layer is a convergence protocol layer.

5. A method as claimed in claim 1, further comprising in response to intermitting the transfer of the link control layer data units to the link control layer, intermitting the acknowledgements of radio link layer data units on radio link layer between the mobile station and the wireless telecommunication network.

6. A method as claimed in claim 1, further comprising including an acknowledgement request in at least one link control layer data unit to be transferred to the link control layer, the transferring of which link control layer data unit starts a timer; and in response to said timer expiring before an acknowledgement is received from the link control layer, intermitting the transfer of the link control layer data units, until acknowledgement of a predefined number of link control layer data units is received from the link control layer.

7. A method as claimed in claim 6, further comprising in response to intermitting the transfer of the link control layer data units to the link control layer, intermitting the acknowledgements of radio link layer data units on radio link layer between the mobile station and the wireless telecommunication network.

8. A packet-switched telecommunication system comprising: a mobile station and a wireless telecommunication network, wherein a telecommunication protocol of said telecommunication system comprises a link control layer for handling control information relating to the data packet transmission and a radio link layer for transmitting the data packets as data units and for acknowledging the transmission between the mobile station and the wireless telecommunication network, the network is arranged to transmit a plurality of radio link layer data units to the mobile station on the radio link layer;

the mobile station is arranged to transfer a number of the radio link layer data units to the link control layer as link control layer data units;

detect a high load situation caused by the transfer of the link control layer data units to the link control layer; and intermit the operation of the radio link layer until a number of link control layer data units has been acknowledged by the link control layer.

9. A mobile station of a telecommunication system, wherein a packet-switched telecommunication protocol of said telecommunication system comprises a link control layer for handling control information relating to the data packet transmission and a radio link layer for transmitting the data packets as data units and for acknowledging the transmission between the mobile station and a wireless telecommunication network, the mobile station comprising:

a receiver configured to receive a plurality of radio link layer data units on the radio link layer from the wireless telecommunication network;

a control unit configured to transfer a number of the radio link layer data units to the link control layer as link control layer data units;

the control unit configured to detect a high load situation caused by the transfer of the link control layer data units to the link control layer; and the control unit configured to intermit the operation of the radio link layer until a number of link control layer data units has been acknowledged by the link control layer.

10. A mobile station as claimed in claim 9, wherein the control unit is further configured to define a first threshold value for limiting the number of link control layer data units transferred to the link control layer without acknowledgement from the link control layer;

define a second threshold value for the number of the link control layer data units to be acknowledged by the link control layer; and responsive to the number of unacknowledged link control layer data units being equal to the number defined by the first threshold value, intermit the transfer of the link control layer data units, until a number of link control layer data units, defined by the second threshold value, has been acknowledged by the link control layer.

11. A mobile station as claimed in claim 10, wherein the control unit is further configured to perform said acknowledgement from the link control layer in response to transferring said link control layer data units to an upper protocol layer.

12. A mobile station as claimed in claim 11, wherein the upper protocol layer is a convergence protocol layer.

13. A mobile station as claimed in claim 9, wherein the control unit is further configured responsive to intermitting the transfer of the link control layer data units to the link control layer, intermit the acknowledgements of radio link layer data units on radio link layer between the mobile station and the wireless telecommunication network.

14. A mobile station as claimed in claim 9, further comprising a timer, the start of which is responsive to a transfer of a link control layer data unit including an acknowledgement request to the link layer; and wherein the control unit is further configured to transfer a number of the link control layer data units to the link control layer, at least one link control layer data unit including an acknowledgement request and to intermit the transfer of the link control layer data units, if said timer expires before an acknowledgement is received from the link control layer, until acknowledgement of a predefined number of link control layer data units is received from the link control layer.

15. A mobile station as claimed in claim 14, wherein the control unit is further configured responsive to intermitting the transfer of the link control layer data units to the link control layer, to intermit the acknowledgements of radio link layer data units on radio link layer between the mobile station and the wireless telecommunication network.

16. A computer readable storage medium containing a computer software product, suitable for execution in a mobile station of a telecommunication system, wherein a packet-switched telecommunication protocol of said telecommunication system comprises a link control layer for handling control information relating to the data packet transmission and a radio link layer for transmitting the data packets as data units and for acknowledging the transmission between the mobile station and a wireless telecommunication network, the computer software product comprising:

a program code for transferring a number of the radio link layer data units, received from the wireless telecommunication network, to the link control layer as link control layer data units;

a program code for detecting a high load situation caused by the transfer of the link control layer data units to the link control layer; and a program code for intermitting the operation of the radio link layer until a number of link control layer data units has been acknowledged by the link control layer.

17. A computer readable storage medium containing a computer software product as claimed in claim 16, further comprising a program code for defining a first threshold value for limiting the number of link control layer data units transferred to the link control layer without acknowledgement from the link control layer;

a program code for defining a second threshold value for the number of the link control layer data units to be acknowledged by the link control layer; and a program code, responsive to the number of unacknowledged link control layer data units being equal to the number defined by the first threshold value, for intermitting the transfer of the link control layer data units, until a number of link control layer data units, defined by the second threshold value, has been acknowledged by the link control layer.

18. A computer readable storage medium containing a computer software product as claimed in claim 17, further comprising a program code for performing said acknowledgement from the link control layer in response to transferring said link control layer data units to an upper protocol layer.

19. A computer readable storage medium containing a computer software product as claimed in claim 16, further comprising a program code, responsive to intermitting the transfer of the link control layer data units to the link control layer, for intermitting the acknowledgements of radio link layer data units on radio link layer between the mobile station and the wireless telecommunication network.

20. A computer readable storage medium containing a computer software product as claimed in claim 16, further comprising a timer carried out as a program code, the start of which is responsive to a transfer of a link control layer data unit including an acknowledgement request to the link layer;

a program code for transferring a number of the radio link layer data units, received from the wireless telecommunication network, to the link control layer as link control layer data units, at least one link control layer data unit including an acknowledgement request; and a program code, responsive to expiration of said timer before an acknowledgement is received from the link control layer, for intermitting the transfer of the link control layer data units, until acknowledgement of a predefined number of link control layer data units is received from the link control layer.

21. A computer readable storage medium containing a computer software product as claimed in claim 20, further comprising a program code, responsive to intermitting the transfer of the link control layer data units to the link control layer, for intermitting the acknowledgements of radio link layer data units on radio link layer between the mobile station and the wireless telecommunication network.

* * * * *

UNITED STATES PATENT AND TRADEMARK OFFICE
CERTIFICATE OF CORRECTION

PATENT NO. : 7,321,574 B2
APPLICATION NO. : 10/743207
DATED : January 22, 2008
INVENTOR(S) : Hannu Anttila Page 1 of 1

It is certified that error appears in the above-identified patent and that said Letters Patent is hereby corrected as shown below:

In the Specification

Col. 7, line 38: "PD-U" should read --PDU--.

In the Claims

Claim 13 at Col. 12, line 11: "layer, intermit" should read --layer, to intermit--.

Signed and Sealed this

Third Day of June, 2008

JON W. DUDAS
*Director of the United States Patent and Trademark Office*